US012613355B2

(12) United States Patent
Rangarajan et al.

(10) Patent No.: US 12,613,355 B2
(45) Date of Patent: Apr. 28, 2026

(54) AI/ML AND BLOCKCHAINED BASED AUTOMATED RESERVOIR MANAGEMENT PLATFORM

(71) Applicant: Landmark Graphics Corporation, Houston, TX (US)

(72) Inventors: Keshava Prasad Rangarajan, Sugarland, TX (US); Raja Vikram R. Pandya, Katy, TX (US); Srinath Madasu, Houston, TX (US); Shashi Dande, Spring, TX (US)

(73) Assignee: Landmark Graphics Corporation, Houston, TX (US)

( * ) Notice: Subject to any disclaimer, the term of this patent is extended or adjusted under 35 U.S.C. 154(b) by 1309 days.

(21) Appl. No.: 17/000,087

(22) Filed: Aug. 21, 2020

(65) Prior Publication Data

US 2021/0058235 A1     Feb. 25, 2021

Related U.S. Application Data

(63) Continuation-in-part of application No. 16/651,859, filed as application No. PCT/US2019/064655 on Dec. 5, 2019, now abandoned.

(Continued)

(51) Int. Cl.
*G01V 1/40* (2006.01)
*G01V 20/00* (2024.01)
(Continued)

(52) U.S. Cl.
CPC ............... *G01V 1/40* (2013.01); *G01V 20/00* (2024.01); *G06F 18/214* (2023.01); *G06F 30/27* (2020.01);
(Continued)

(58) Field of Classification Search
CPC ....... G06F 30/27; E21B 2200/22; H04L 9/50; H04L 9/0637; H04L 9/0643; G01V 20/00
See application file for complete search history.

(56) References Cited

U.S. PATENT DOCUMENTS 9,934,338 B2      4/2018    Germain et al.
10,223,482 B2     3/2019    Borrel et al.
(Continued)

FOREIGN PATENT DOCUMENTS

KR       10-1706245 B1      2/2017
WO       2017188858        11/2017
(Continued)

OTHER PUBLICATIONS

Lankhanpal et al. Implementing Blockchain Technology in Oil and Gas Industry: A Review SPE-191750, Society of Petroleum Engineers, 2018 (Year: 2018).*

(Continued)

*Primary Examiner* — Rehana Perveen
*Assistant Examiner* — Cuong V Luu
(74) *Attorney, Agent, or Firm* — DeLizio, Peacock, Lewin and Guerra, LLP

(57) ABSTRACT

A system for managing well site operations comprising a well site operations module, a chain of blocks of a distributed network, and a sensor bank and control module. The operations module generates earth model variables using a physics model, well log variables or seismic variables, or both, and a trained AI/ML algorithmic model. The chain of blocks comprises a plurality of subsequent blocks. Each subsequent block comprises a well site entry and a hash value of a previous well site entry. A well site entry comprises transacted operation control variables. The well site operations module generates production operation control variables or development operation control variables from (Continued)

60 earth model variables. The well site entry can also include transacted earth model variables and sensor variables. The sensor bank and control module provides well log variables and the operations module couples control variables to the control module to control well site equipment.

20 Claims, 8 Drawing Sheets

Related U.S. Application Data

(60) Provisional application No. 62/891,223, filed on Aug. 23, 2019.

(51) Int. Cl.

| | |
|---|---|
| *G06F 18/214* | (2023.01) |
| *G06F 30/27* | (2020.01) |
| *G06N 5/04* | (2023.01) |
| *G06N 7/01* | (2023.01) |
| *G06N 20/00* | (2019.01) |
| *H04L 9/00* | (2022.01) |
| *H04L 9/06* | (2006.01) |
| *H04L 9/32* | (2006.01) |

(52) U.S. Cl.
CPC ................. *G06N 5/04* (2013.01); *G06N 7/01* (2023.01); *G06N 20/00* (2019.01); *H04L 9/006* (2013.01); *H04L 9/0637* (2013.01); *H04L 9/0643* (2013.01); *H04L 9/3247* (2013.01); *E21B 2200/20* (2020.05); *E21B 2200/22* (2020.05); *H04L 9/50* (2022.05)

(56) References Cited

U.S. PATENT DOCUMENTS

| | | |
|---|---|---|
| 2003/0168257 A1 | 9/2003 | Aldred et al. |
| 2008/0289877 A1 | 11/2008 | Nikolakis-Mouchas et al. |
| 2009/0157367 A1 | 6/2009 | Meyer et al. |
| 2009/0262603 A1 | 10/2009 | Hurley et al. |
| 2012/0217067 A1 | 8/2012 | Mebane, III et al. |
| 2014/0067353 A1 | 3/2014 | Shelley et al. |
| 2014/0116776 A1 | 5/2014 | Marx et al. |
| 2014/0351183 A1 | 11/2014 | Germain et al. |
| 2015/0148919 A1 | 5/2015 | Watson |
| 2015/0330209 A1 | 11/2015 | Panchal et al. |
| 2015/0369030 A1 | 12/2015 | Hay et al. |
| 2016/0312552 A1 | 10/2016 | Early et al. |
| 2017/0335671 A1 | 11/2017 | Dykstra et al. |
| 2018/0171769 A1 | 6/2018 | Gu et al. |
| 2018/0230782 A1 | 8/2018 | Pankaj et al. |
| 2018/0307561 A1 | 10/2018 | Iljazi |
| 2019/0169986 A1 | 6/2019 | Storm, Jr. et al. |
| 2020/0149386 A1 | 5/2020 | Menand |
| 2021/0019351 A1 | 1/2021 | Dixon et al. |
| 2021/0326721 A1* | 10/2021 | Zhang ...................... G06N 5/04 |
| 2022/0164455 A1* | 5/2022 | Jeanson ................. G06Q 50/02 |
| 2022/0348903 A1* | 11/2022 | Ranganathan ......... G16B 25/10 |

FOREIGN PATENT DOCUMENTS

| | | |
|---|---|---|
| WO | 2018145201 | 8/2018 |
| WO | 2019028269 | 2/2019 |

OTHER PUBLICATIONS

Kapitonov et al. Robotic Services for New Paradigm Smart Cities Based on Decentralized Technologies Ledger 2019 (Year: 2019).*

Lu, Hongfang, et al. "Blockchain technology in the oil and gas industry: A review of applications, opportunities, challenges, and risks." Ieee Access 7 (2019): 41426-41444.

International Search Report and Written Opinion date mailed Dec. 2, 2020; International PCT Application No. PCT/US2020/047498.

International Search Report and Written Opinion date mailed Dec. 2, 2020; International PCT Application No. PCT/US2020/047499.

International Search Report and Written Opinion date mailed Nov. 27, 2020; International PCT Application No. PCT/US2020/047502.

LaValle, Steven M., and James J. Kuffner. "Rapidly-exploring random trees: Progress and prospects." Algorithmic and computational robotics: new directions 5 (2001): 293-308.

Karaman, Sertac, and Emilio Frazzoli. "Sampling-based algorithms for optimal motion planning." The international journal of robotics research 30.7 (2011): 846-894.

Stentz, Anthony. The D* Algorithm for Real-Time Planning of Optimal Traverses. No. CMU-RI-TR-94-37. Carnegie-Mellon Univ Pittsburgh PA Robotics Inst, 1994.

Solomon, Matthew David. Development of a real-time hierarchical 3D path planning algorithm for unmanned aerial vehicles. Diss. 2016.

Coulter, R. Craig. Implementation of the pure pursuit path tracking algorithm. Carnegie-Mellon Univ Pittsburgh PA Robotics Inst, 1992.

International Search Report and Written Opinion date mailed May 21, 2020, International PCT Application No. PCT/US2019/064655.

"U.S. Appl. No. 17/000,096 Final Office Action", Jan. 2, 2025, 13 pages.

Examination Report mailed Nov. 6, 2023 for GB Patent Application No. GB2200679.5.

"Oil and Gas industry: Will Machine Learning algorithms be helpful?" dated Dec. 11, 2017, retrieved on Dec. 12, 2023 from https://bitrefine.group/industries/big-data-manufacturing/107-articles/ml-articles/manufacturing-ml-article/269-oil-and-gas-industry-will-machine-learning.

* cited by examiner

60

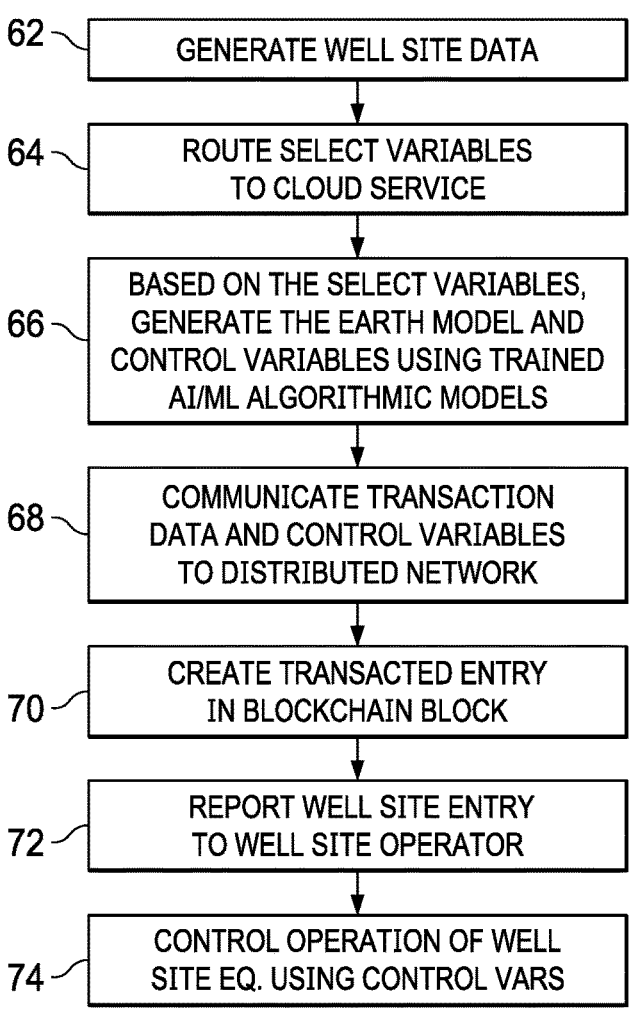

| | WELL SITE DATA |
| --- | --- |
| | WELL SITE ID: XXX14 |
| | SENSOR/CONTROLLER ID: XXX143 |
| | VARIABLE DATA: - - - |
| | WELL SITE OPERATOR DATA: - - - |

62 — GENERATE WELL SITE DATA

64 — ROUTE SELECT VARIABLES TO CLOUD SERVICE

66 — BASED ON THE SELECT VARIABLES, GENERATE THE EARTH MODEL AND CONTROL VARIABLES USING TRAINED AI/ML ALGORITHMIC MODELS

68 — COMMUNICATE TRANSACTION DATA AND CONTROL VARIABLES TO DISTRIBUTED NETWORK

70 — CREATE TRANSACTED ENTRY IN BLOCKCHAIN BLOCK

72 — REPORT WELL SITE ENTRY TO WELL SITE OPERATOR

74 — CONTROL OPERATION OF WELL SITE EQ. USING CONTROL VARS

FIG. 2

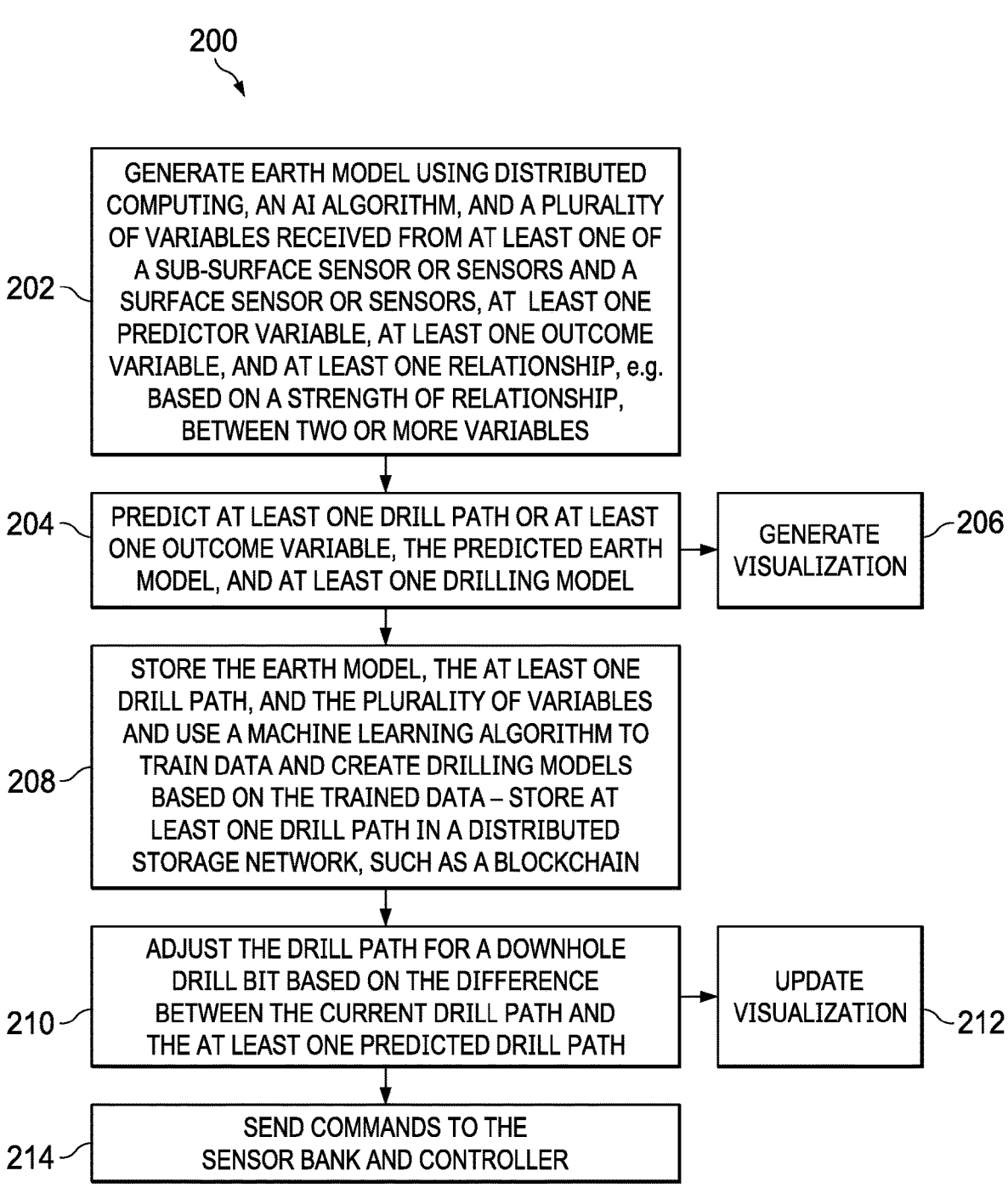

200

202 — GENERATE EARTH MODEL USING DISTRIBUTED COMPUTING, AN AI ALGORITHM, AND A PLURALITY OF VARIABLES RECEIVED FROM AT LEAST ONE OF A SUB-SURFACE SENSOR OR SENSORS AND A SURFACE SENSOR OR SENSORS, AT LEAST ONE PREDICTOR VARIABLE, AT LEAST ONE OUTCOME VARIABLE, AND AT LEAST ONE RELATIONSHIP, e.g. BASED ON A STRENGTH OF RELATIONSHIP, BETWEEN TWO OR MORE VARIABLES

204 — PREDICT AT LEAST ONE DRILL PATH OR AT LEAST ONE OUTCOME VARIABLE, THE PREDICTED EARTH MODEL, AND AT LEAST ONE DRILLING MODEL

206 — GENERATE VISUALIZATION

208 — STORE THE EARTH MODEL, THE AT LEAST ONE DRILL PATH, AND THE PLURALITY OF VARIABLES AND USE A MACHINE LEARNING ALGORITHM TO TRAIN DATA AND CREATE DRILLING MODELS BASED ON THE TRAINED DATA – STORE AT LEAST ONE DRILL PATH IN A DISTRIBUTED STORAGE NETWORK, SUCH AS A BLOCKCHAIN

210 — ADJUST THE DRILL PATH FOR A DOWNHOLE DRILL BIT BASED ON THE DIFFERENCE BETWEEN THE CURRENT DRILL PATH AND THE AT LEAST ONE PREDICTED DRILL PATH

212 — UPDATE VISUALIZATION

214 — SEND COMMANDS TO THE SENSOR BANK AND CONTROLLER

FIG. 5

AI/ML AND BLOCKCHAINED BASED AUTOMATED RESERVOIR MANAGEMENT PLATFORM

CROSS-REFERENCE TO RELATED APPLICATIONS

This application is a continuation in part of U.S. patent application Ser. No. 16/651,859 filed on Mar. 27, 2020 entitled "AI/ML Based Drilling and Production Platform", which is a 371 of International Application No. PCT/US2019/064655 filed Dec. 5, 2019, which claims the benefit of Provisional Patent Application Ser. No. 62/891,223, filed Aug. 23, 2019 both of which are incorporated herein by reference.

BACKGROUND

Artificial Intelligent (AI) and Machine Learning (ML) are technologies that can be used to improve traditional methods and practices of various industries. Technologies developed therefrom are in general developed and used to automate machinery and improve a machine's performance, e.g. precision control and diagnostics. The advantages of each can spawn new industries, improve product development, and create safer work environments. An area of particular interest is the automation of machinery used in hydrocarbon reservoir development and production. However, hydrocarbon reservoir development and production is a time consuming, complex, and expensive endeavor that requires skilled personnel to oversee and properly manage. Therefore, the automation and diagnostics of machinery to perform this endeavor requires a vast amount of knowledge and precision. As such, the integrity of any data, or information, which is used to diagnose and automate machinery and/or in general provides information in the form of analysis for decision making purposes must be maintained.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 2 is an illustration a flow diagram of an algorithm for creating blocks in the blockchain, in accordance with certain example embodiments;

FIG. 5 is an illustration of a flow diagram of an algorithm for a predictive engine, in accordance with certain example embodiments.

DETAILED DESCRIPTION

Figure 1:
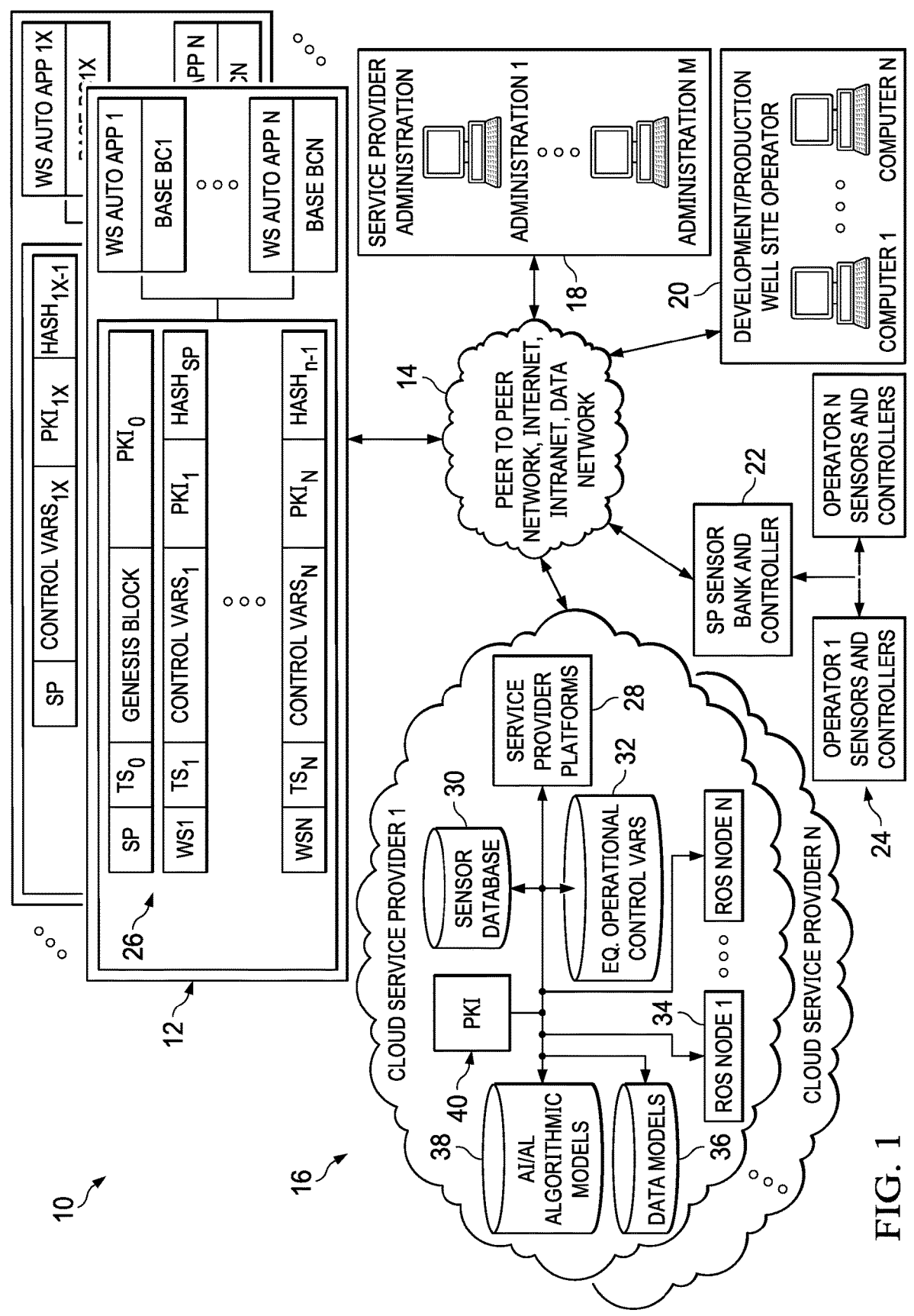
FIG. 1 is an illustration of a diagram of a system for controlling drilling and production operations of a well site, in accordance with certain example embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

As previously stated, data, i.e. operation control data and diagnostics data, used in the diagnostics and automaton of machinery used hydrocarbon reservoir development and production must be securely. Otherwise, precision may be compromised and valuable time, expense, revenue, and resources lost. Blockchain is a promising technology that can be used to manage data in a secure manner using a distributed network architecture. Data stored in a blockchain cannot be easily compromised. Therefore, data that is considered sensitive can be securely stored in a blockchain which can prevent the corruption and unauthorized access thereto.

Presented herein is a system for managing well site operations. The system comprises a well site operations module and a chain of blocks of a distributed network. The well site operations module includes a well site operations module communicable coupled to a distributed network. The well site operations module can generate earth model variables using a physics model, well log data variables, seismic data variables, and a trained artificial intelligence algorithmic model and/or a trained machine learning algorithmic model. The chain of blocks of the distributed network comprises a genesis block and a plurality of subsequent blocks. Each subsequent block comprising a well site entry and a cryptographic hash value of a previous well site entry, wherein the and a well site entry comprises at least one transacted operation control variable. The well site operations module generate operation control variables for controlling well site production equipment or well site development equipment. The well site entry can also include transacted earth model variables and sensor variables, which can include well log data variables and seismic data variables.

Also presented herein is an apparatus for managing well site operations. The apparatus includes a chain of blocks of the distributed network and a well site automations module. The chain of blocks comprises a genesis block and a plurality of subsequent blocks. Each subsequent block comprises a well site entry and a cryptographic hash value of a previous well site entry. The well site entry comprises at least one transacted operation control variable. The well site automation module is communicable coupled to a well site operations module and a sensor bank and controller module. The well site automation module creates blocks and transactions and communicable couples variables between well site entries, the well site operations module, and the sensor bank and controller module. The well site entry can also include transacted well log data variables and seismic data variables provided by a sensor bank communicable coupled to well site equipment. The well site entry can also include transacted earth model variables.

Additionally, presented herein is a method for managing well site operations. The method includes generating earth model variables, generating operation control variables, and creating a chain of blocks in a distributed network. The earth model variables are generated using a physics model, well log data variables, seismic data variables, and/or a trained artificial intelligence algorithmic model and/or a trained machine learning algorithmic model, or any combination thereof. The operation control variables are generated based on the generated earth model variables. The chain of blocks of the distributed network includes a genesis block and a plurality of subsequent blocks. Each subsequent block includes a well site entry and a cryptographic hash value of a previous well site entry. The well site entry comprises transacted operation control variables. The operation control variable can be for controlling well site production operation equipment or well site development operation equipment. The method can include creating at least one transacted earth model variable in the well site entry, generating well log data variables and seismic data variable, and creating well log data variable entries in the well site entry.

In this specification, artificial intelligence means an algorithm that can create a data model based on relationships between variables, the strength of relationships, and interactions between variables. Bayesian Optimization is an optimization algorithm. Multi-objective means an optimization case/situation where more than one interrelated objective functions need to be optimized. Bayesian optimization used for multi-objective situation is referred to as multi-objective Bayesian optimization. Machine learning means a statistical algorithm that can train data to create a learned data model based on historical variables, and the training thereof, and modify and update the data model based on newly obtained single or multiple observations. Data model means a set of variables selected from a data source based on predictor variables, outcome variables, and relationship, i.e. strength of relationship between variables. Strength of relationship can be between predictor variables and outcome variables. Predictor variables are variables used to predict an outcome. Outcome variables are variables in which their value is dependent on a predictor variable or predictor variables. Feature selection means an algorithm that can identify and select variables within a data source that contribute to the predictor variables and outcome variables. Variable interaction means that the contribution of one predictor variable is modified by one or many other predictor variables, so that the combined contribution of all variables involved in the interaction is greater than the simple sum over the individual contributions attributable to each variable. An earth model defines the spatial distribution of sub-surface properties such as permeability, porosity, faults, salt bodies, etc. Typical variables in a drilling model can include, and without limitation, weight on bit, rotations per minute of the drill bit, mud flow rate, differential pressure of the mud-motor, stand pipe pressure. The term sensor variables refers to variables generated by sensors and that broadly covers well log data variables, seismic data variables, and geographic coordinates. The term transacted refers to creation of a block in a block chain by a blockchain application service that is a part of the blockchain and that can include select variables and other data. The physics model refers to models which are derived based of first principle laws of physics and could include adjustable parameters which are tuned using observations (experimental data and or data from real field situations) so to make the model consistent with observations within the uncertainty and error range of the data.

Referring now to FIG. 1, illustrated is a diagram of a system for controlling drilling and production operations of a well site, in accordance with example embodiments, denoted general as 10. The system 10 comprises a blockchain 12, a network 14, e.g. a distributed network, such as a peer to peer network, at least one cloud service 16, service provider administration systems 18, well site operator systems 20, and sensor bank module and controller 22, sensors and controllers 24. In practice, the system 10 provides an architectural solution that enables well site operator personnel to understand geological structure of a well site, including surface and sub-surface topography and operations of well site equipment. The architectural solution consists of three modules, a well site automation module, a well site operations module, and a sensor bank and controller module. The well site automation module manages communication and processing of the blockchain 12 and service provider administration systems 18. The well site operations module manages communication and processing for cloud service 16, and well site operator systems 20. The sensor bank and controller module manages communication and processing for sensor bank module and controller 22 and sensors and controllers 24. The module together work to perform the functions described herein.

Based on processing and communications performed by the modules, well site operator can manage operations of well site equipment based on a plurality of variables and variable types procured from various sources, data models, Machine Learning (ML) and Artificial Intelligence (AI) algorithmic models using operation control variables procured therefrom. Provenance and security of the variables, such as the operation control variables, are preserved in the blockchain 12. Other variables can also be stored in the blockchain 12. The integrity of the data can be further maintained by relying on multiple cloud service providers to maintain and provide the Public Key Infrastructure (PKI) between consumer and the blockchain Service Provider (SP).

The blockchain 12 further comprises a plurality of base blockchain applications (Base BC1-Base BCN), associated well site automation applications (WS Auto App1-WS Auto AppN), and blocks 26 with each block have a transacted well site entry. The base blockchain applications (Base BC1-Base BCN) can be a standard blockchain application provided through various commercial channels, such a blockchain platform provided by IBM®. The blockchain applications create blocks within storage nodes (not illustrated) of a distributed network of network 14. A storage node is obviously storage within a database, file system, and/or memory, or any combination thereof. In the case of the communications from connected devices to the blockchain 12, the network 14 is a distributed network, such a peer to peer network. Other communications can be over traditional Internet, intranet, and data network communication channels. The bearer service can be a physical or wireless channel. Transactions communicated from network connected devices are communicated to an access point on the distributed network and broadcast to the base blockchain applications (Base BC1-Base BCN).

In practice, a first block is created in the blockchain 12 called a genesis block and provides base components, such as a nonce, public key, and signature. The genesis block is owned by an entity providing the blockchain application services, that is to say the blockchain SP. The public key and signature are from the PKI and can be provided by one or more cloud service providers. In the event of multiple providers, the infrastructure is from independent sources and, therefore, the blockchain 12 can comprise of truly disparate blocks that are far less likely to be compromised. However, proper management of the infrastructure under a single service provider scenario can also be as secure providing the provider properly secures the PKI keys and signatures.

A well-known technique of creating blocks within the blockchain 12 is to configure the base blockchain applications (Base BC1-Base BCN) to compete to solve a complex problem. As an example, the base blockchain applications (Base BC1-Base BCN) can compete to solve for a particular nonce. The application that solves the problem first is awarded the next block in the blockchain and, therefore, can create a transacted well site entry in the awarded block. Although, the particular method of how blocks are created can be performed in other ways. The blocks 26 can include a well site entry, a nonce, a hash of a previous block or portion of the previous block, and public key and signature from a PKI. The entity making a transaction, such as well site operator systems 20, sensor bank and controller 22, and/or ROS Node or Nodes own the private key. A well site entry can include a time stamp and equipment control variables. Although it is contemplated that other variables can also be stored, such as earth model variables and algorithmic models. The hash is created using the public key of a previous block and the well site entry for that previous block.

The cloud service 16 can be network services provided by a well site operator, the blockchain service provider, and network services provided by third parties, such as Amazon Web Services (AWS®) and IBM Cloud Managed Services®. Service provider services can include service provider platform 28, a sensor database 30, equipment operational control variables database 32, Robot Operating System (ROS) nodes 34, a data models database 36, an Artificial Intelligence (AI)/Machine Learning (ML) algorithmic models database 38, and a PKI database 40. Obviously, depending on the service provider, not all features may be present. The service provider platform 28 can be any operating system that provides base operating system application services.

In an embodiment, the system 10 describes two service providers, cloud service providers 16 and a service provider of the blockchain 12. The cloud service providers 16 can be a third party service provider, as previously stated, the service provider of the blockchain 12, a well site operator, or any combination thereof. Services of the blockchain service provider also includes the sensor bank and controller 22. The sensor bank and controller 22 provides an access point for communications from an operator's sensors and controllers 24 into the services provided by the system 10.

In practice, communications from the well site operator systems 20 and the sensor bank and controllers 22 can include identifiers identifying an AI/ML algorithmic model or models, data models, trained algorithmic models, sensor variables, and ROS automation and configuration variables. The ROS nodes 34 can be configured to automatically build trained algorithmic models using the geographical and geological data models, the AI/ML algorithmic models, and equipment operation variables. The ROS nodes 34 can use the trained algorithmic models against the sensor variables to generate earth model variables and equipment operation control variables. The sensor variables can identify geological information and geographical information of a subterranean well, e.g., and geographical information and operation variables of equipment therein. The earth model variables can include geographical coordinates of the equipment in operation and the control variables include operational parameters and values. The ROS nodes 34 can store the control variables in the equipment operational control variables database 32 and communicate the control variable to the blockchain 12 through the distributed network 14 in order to create an entry in the blockchain 12.

In a service oriented system, the ROS nodes 34 can process work orders from multiple well site operators and create entries in the blockchain in real-time or near real-time. A well site operator 20 or, in the event of a genesis block, the blockchain service provider 18 receive a PKI keyset, i.e. the public and private key, and digital signature from the cloud service provider 16. The blockchain service provider 18 and the well site operator 20 securely store the private key locally and the public key is stored in the blockchain 12 or stored in a place managed by the base blockchain applications (Base BC1-Base BCN) and associated well site automation applications (WS Auto $App_1$-WS Auto $App_N$). The public key is obviously used to create the hash of a previous well site entry or block and the private key used to recreate the entry from the hash.

The sensor variables can include, and without limitation, production equipment measurements, telemetry data for various instruments, rig sensing data, surface measurements, fluid and additive measurements, downhole measurements LWD/LIWD, cementing measurements, wireline and perforations data, and earth model data. The operation control variables can comprises variables that, and without limitation, control production equipment, such as cementing equipment, rigs, wireline and perforation equipment, and a rotary steerable electronic bit. The control variables are forecast variables that are generated based on predictive analysis, which will be described in more detail later. Once an entry is transacted in a block of the blockchain 12, the control variables may be immediately routed to the sensor bank and controller 22 to control equipment operations or delayed until an appropriate time that can be based on decisions from well site operator personnel and/or at time deemed necessary based on the forecast and instantaneous or updated sensor variables.

Referring now to FIG. 2, illustrated is a flow diagram of an algorithm for creating blocks in the blockchain 12, well site entries in the blocks 26, and using the well site entries to control operations of well site equipment, in accordance with example embodiments, denoted general as 60. The algorithm 60 describes the functions of the well site automation module, the well site operations module, and the sensor bank and controller module previously discussed in reference to FIG. 1. The algorithm 60 is not intended to be a step by step guide to programming the modules but rather a general outline of its function. One of skill in the art of software development can easily render the necessary software code to perform the communications and processing outlined given the innovative aspects of the modules.

The algorithm 60 begins at block 62 where well site data is generated. Well site data can include, and without limitation, a well site identifier, sensor identifier, sensor variables, and well site operator data. In practice, the well site operator or well site operator personnel can determine what data should be included in well site data. Sensor identifier can identify well site equipment and/or components of the equipment. The sensor variables can include well log data variables, seismic data variables, and geographic coordinates. Well site operator data can identify a trained algorithmic model and other data that may be relevant to computations used in a trained algorithmic model. This can include the manipulation of variable data such as sensor variables, e.g. based on subject matter expert input. At block 64, the operator select variables are routed to a cloud service or services 16. These select variables can come from service provider administration system 18, well site operator system 20, and/or the sensor bank and controller 22. At block 66, based on the select variables, variables are computed. The computed variables can include an earth model and equipment operation control variables. The computation of the computed variables is discussed in greater detail in reference to FIGS. 3-5. At block 68, a well site entry is generated and communicated to the distributed network 14. The well site entry can include, and without limitation, a well site identifier, computed variables, and a public key of the PKI 38. What is exactly included in the well site entry can also be determined by the well site operator. The well site entry can include. Computed variables can include earth model variables, equipment operation control variables, and algorithmic models. At block 70, an entry is created in a block or blocks 26 of the blockchain 12. The transacted entry can include, and without limitation, well site identifier, a time stamp, computed variables, a public key, and a hash value of a previous block. At block 72, operation of well site equipment is controlled using the control variables. Operation of the equipment can be controlled in real-time or based on a timer or a trigger, such as a decision from well site personnel or subsequent computations.

With respect to controlling operations, the earth model can be used to determine drilling regions through which drilling can progress from a starting location to a target location, while going through various waypoints. The starting location, the waypoints, and the target location can be provided by a user. A possible drilling region can be selected by imposing various constraints; such as, avoiding regions in earth model where possibility of mud loss is higher, avoiding water and salt regions, etc. Various AI and ML based algorithms, to be discussed in reference to FIGS. 3-6, include features that generate and predict a new optimum path (dynamically) from drill bit location to target location. When the drill bit deviates too much from originally planned path. This dynamic updating of new path also takes into account new information obtained by sensors located near the drill bit and which are relevant to updating of earth model from time to time. The various AI and ML based algorithms also include features for path planning; which are based on path searching in the presence of obstacles algorithm and pure pursuit algorithm. These particular generate control variables information for controlling altitude and trajectory of drill bit so as to follow the optimum path. Simultaneously, other features of the AI and ML based algorithms include a drilling optimizer that is based on an optimization algorithm, such as Bayesian optimization, and deep learning algorithm provides suggestions for optimum values for drilling related control parameters, such as RPM (Revolutions Per Minute), WOB (Weight On Bit), mud flow rate etc.

Figure 3:
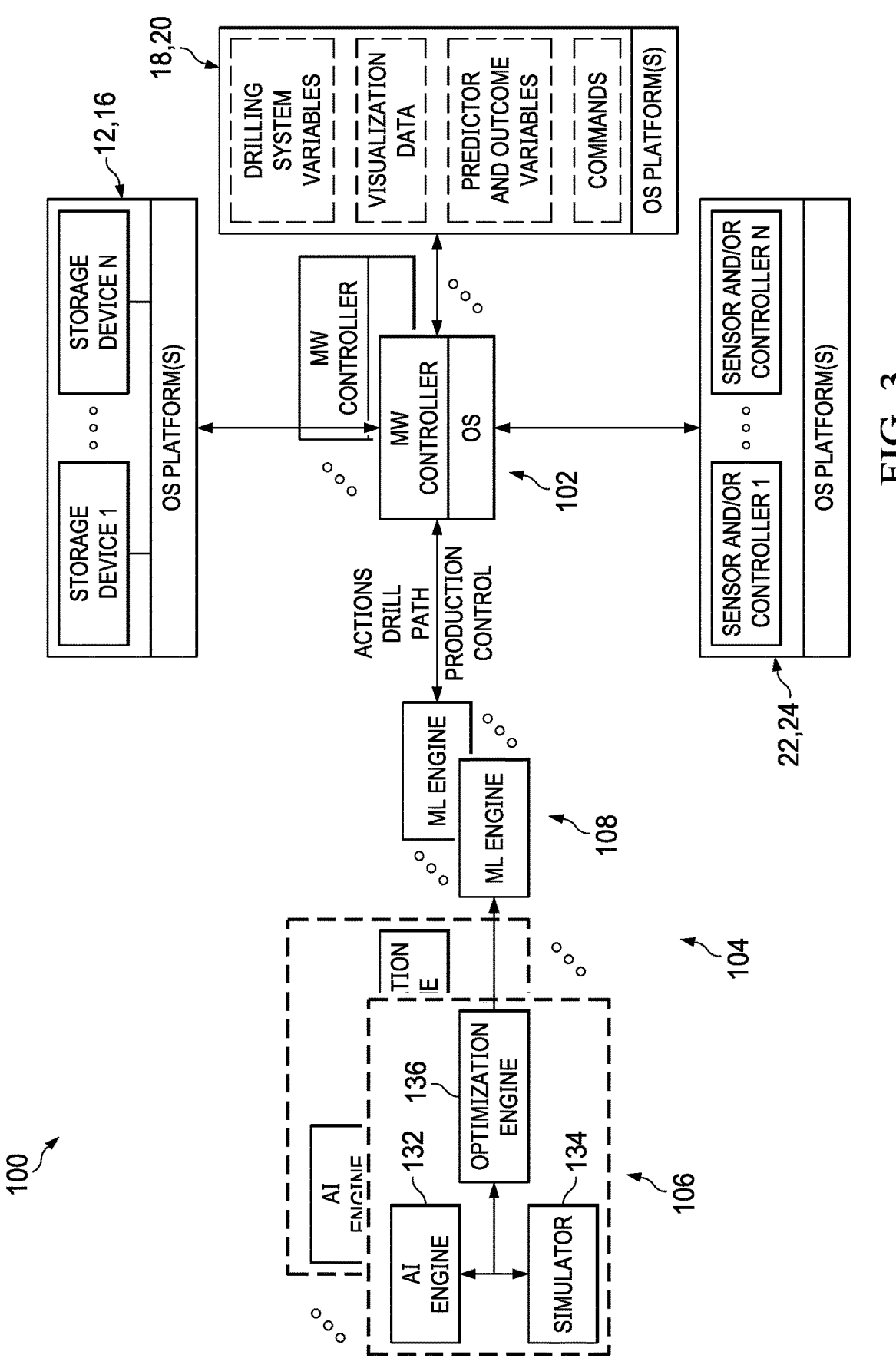
FIG. 3 is an architectural diagram of a system for controlling drilling and production operations of a well environment, in accordance with certain example embodiments.

Referring now to FIG. 3, illustrated is a block diagram of a system stack for a distributed computing environment and communicable coupled components for generating predictive variables used in the management and control of drilling and production operations of a well site, in accordance with example embodiments, denoted generally as 100. The system stack 100 can be a clustered computing environment. The system stack 100 can be executed on a hardware node, partitions of a hardware node, a plurality of hardware nodes, or a combination thereof. The system stack 100 includes a hardware node having an executable partition or plurality of executable partitions, such as containers or virtualized systems, dedicated to processing complex analytics or performing other associated functions. In the case of containers, the partition or partitions have dedicated and shared resources. The partition or partitions have OS kernel space and user space applications, or at least kernel space applications. OS kernel space and user space applications that are shared are read only. In the case of the virtualized system, each executable partition uses its own dedicated OS and hardware resources. A virtualized system does not share software resources with other partitions. An example use case in cloud services environment can be to install analytic tools in dedicated containers to perform complex analytics operations and install auxiliary services, such as database management and communication security services, on virtualized systems. Partitions in this context refers to computing resources, such as memory space, disc space, computing resources, and file space.

The system stack 100 includes at least one node system stack 102 and at least one predictive engine 104. Each predictive engine 104 comprises a drill path and production control pattern recognition component 106 and a Machine Learning (ML) engine 108. The coupled components can comprise blockchain 12, cloud service 16, service provider administration systems 18, well site operator systems 20, sensor bank module and controller 22, sensors and controllers 24.

Each node system stack 102 comprises at least one Operating System (OS) and a middleware controller. Depending on the particular process or processes within the context of the system stack 102, the system stack 102 may not include an OS but rather only the middleware controller. In this case, the middle ware controller is fitted with code to perform a particular process of, e.g., the predictive engine 104. The middleware controller is a software component that is operable on a node, e.g. ROS nodes 34, between a physical layer and user space applications and/or certain OS kernel applications. The physical layer being a software and hardware layer that provides necessary details of how to interface data through a transmission medium. Common middleware components include the MAC (Medium Access Control) layer, network layer, and transport layer of the OSI (Open Systems Interconnection) model. An example of the middleware controller is the open source Robot Operating System (ROS).

A function of the ROS nodes 34 is to perform complex analytics, generate control variables, store said variables, and manage drilling operations. A function of the ROS based node system stack 102 is to integrate nodes and partitions within the distributed computing environment by managing Inter Process Communications (IPC). In effect, the middleware controller, at minimum, is a scheduler for a distributed computing environment. IPC in this context can be communications between processes instantiated on the same node, e.g. over a local loop or in memory, partitions of the same node, and nodes and partitions on a network. Instantiated processes can be a process of a predictive engine 104, other middleware components, and various OS kernel and user space applications.

The node(s) and partitions can be set to execute an instance of the predictive engine 104. However, the node(s) and partitions can be dedicated to executing a process or processes of the predictive engine 104. As an example, a cluster of nodes and partitions can be dedicated to executing the pattern recognition component 106, i.e. a particular process of the predictive engine, and another cluster dedicated to executing the ML engine 108. Obviously, the nodes and partitions can be clustered based on a more specific process. As an example, some nodes and/or partitions can be dedicated to particular complex analytics, such as Bayesian optimization. In any event, the middleware controller of the ROS based node system stack 102 and the node(s) and partitions are configured to share messages between executing entities to accomplish an analytics goal and provide control variables for managing well site operations. Furthermore, nodes and partitions can be set up and designated as preforming analytics operations, such as a node and partition configured as the predictive engine 104 or sub-process of such, or system control operations, such as controlling drilling operations of a particular machine for a particular site.

The predictive engine 104 can be used to generate optimal drilling paths and optimal production control variables based on data models, AI algorithms, and ML algorithms. The drilling patterns can be generated for consumer consumption to assist in and improve performance of drilling and production operations and/or the automation and improved performance, i.e. control and accuracy, of drilling and production equipment. The predictive engine 104 can comprise a drill path and production control pattern recognition component 106 and an ML engine 108. The pattern recognition component 106 can comprise an AI engine 132, a simulator 134, and an optimization engine 136. In an embodiment, the AI engine 132 can predict an earth model based on well log and seismic data variables collected from field device components 18, other input data, and an AI algorithm.

The well log data variables and seismic data variables can include current drilling coordinates, production equipment measurements, rig sensing and control, fluids and additive measurements, cementing measurements and controls, wireline and perforations sense and control, telemetry, surface measurements, downhole measurements, rotary steerable electronic bit, and earth physical properties data. The other data can include initial realizations from well planning variables and Subject Matter Expert (SME) variables. The accuracy of the generated earth model is assessed using a simulator 134. For example, the accuracy of the generated model can be assessed based on a reservoir fracking or reservoir production simulation. In essence, historical data and trained data can be used to assess whether the generated model can be determined to be reliable based on past historical models and operations. Using the aforementioned variables, the results of the simulator 134, and the AI algorithm, an earth model beyond a current location of a downhole drill bit can be predicted. Examples of AI algorithms that can be used include, without limitation, Neural Network, Randomforest, Gradient boosting etc.

The optimization engine 136 can generate a drill path or production control variable or variables using statistics based pattern recognition, such as using stochastic modeling techniques, and the generated earth model. The drill path can be a set of variables defining sub-surface, earth coordinates. Based on the generated drill path, actions can also be generated describing what corrective actions or manipulations of equipment are needed in order to create an optimal drill path. The production control variables can be a set of variables used to control a valve or a pump.

The predictive engine 104 can record the earth model and the drill path and control variable(s) along with other variables in the storage devices 12 and/or 16. After enough data is stored, the ML engine 108 can create data models having a reduced parameter set by using a learning algorithm. The AI algorithm can then reduce its own algorithmic parameter set by validating against the trained data models having the reduced parameter set. Based on received sensor data from the sensor bank and controller 22, well log data variables and seismic data variables, and the AI algorithm having the reduced parameter set, an optimal drill path can be determined. Machine learning algorithms, such as MultiVariate Regression model (MVR), Artificial Neural Network (ANN), or a decision tree-based algorithm, or any combination thereof, can be used to generate the training and validation datasets and the trained algorithmic models used to create the data models. The decision tree-based algorithm can be an Extreme Gradient Boosting (XGB) algorithm.

A visualization engine can be used to display the generated drill path and production control variables and actions along with other relevant data. The visualization engine can display the generated drill path and production control variables and actions in real-time or near real-time and can display the drill paths and production variables in graphs, charts, or any other type of visualization typically used in visualization platforms. The visualization engine is also configured to retrieve drill paths from the storage devices 12 and/or 16. In an embodiment, a user or consumer can define the predictive and outcome variables used to generate the drill path variables. In another embodiment, the predictive and outcome variables can be predefined, e.g. using a-prior models, drill, and production control variables. The user also can issue commands in order to change or adjust the actions and drill path based on other information, e.g. information from a SME.

Figure 4A:
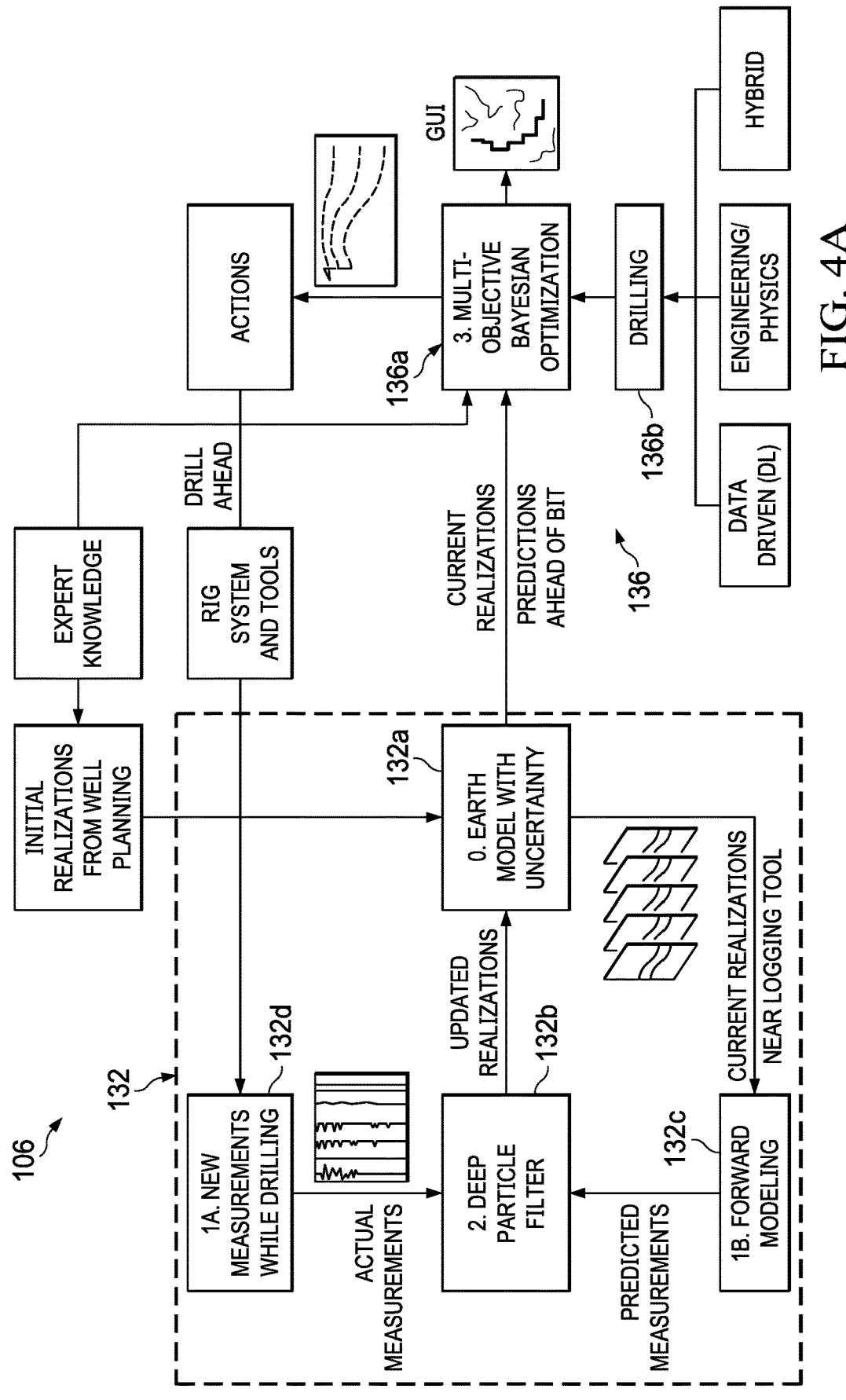
FIGS. 4A-4C, are illustrations of diagrams of a pattern recognition component that comprises an AI engine and a pattern recognition component, which comprises the AI engine and an ML engine, and a visualization generated therefrom, in accordance with certain example embodiments.
Figure 4B:
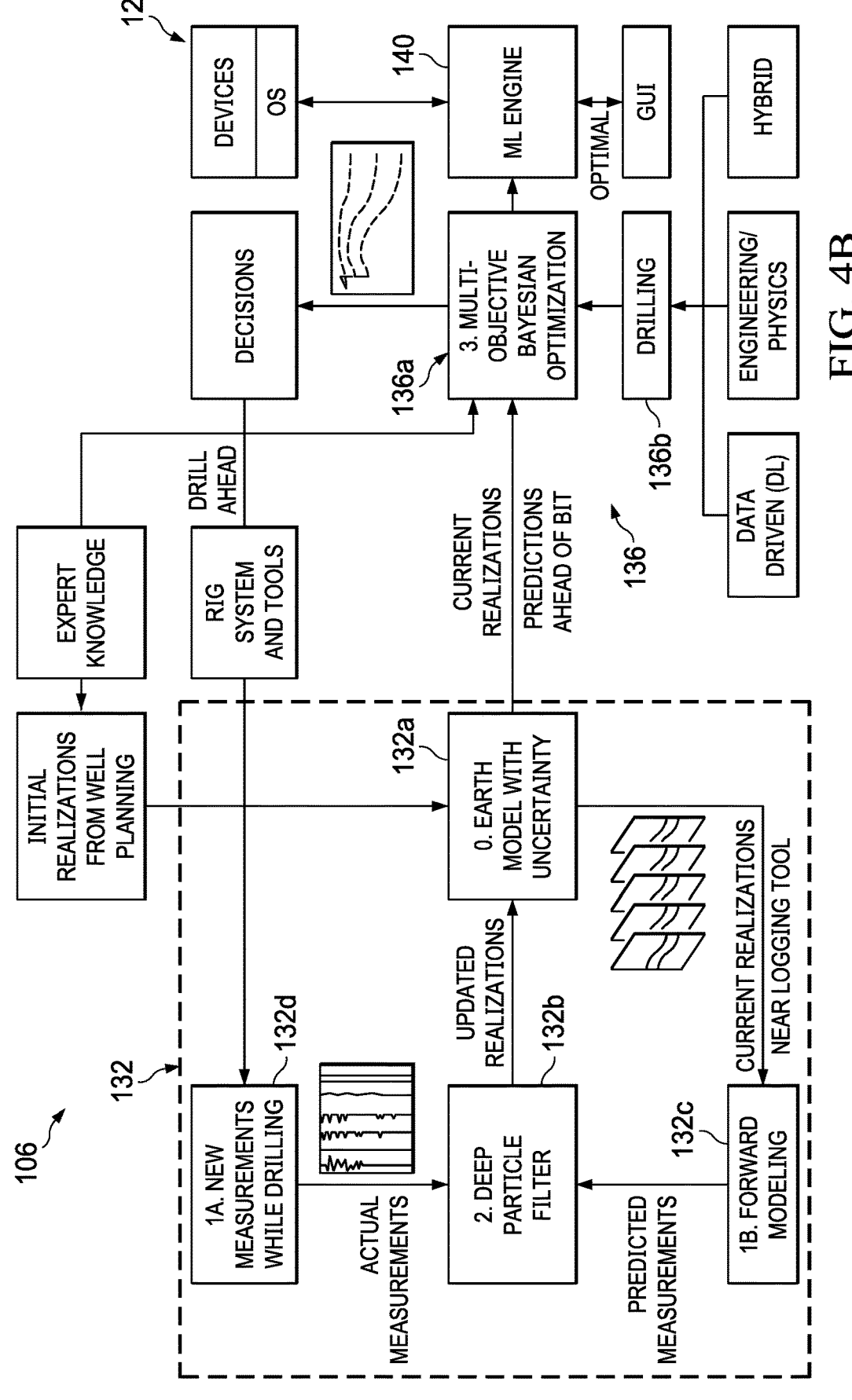
Figure 4C:
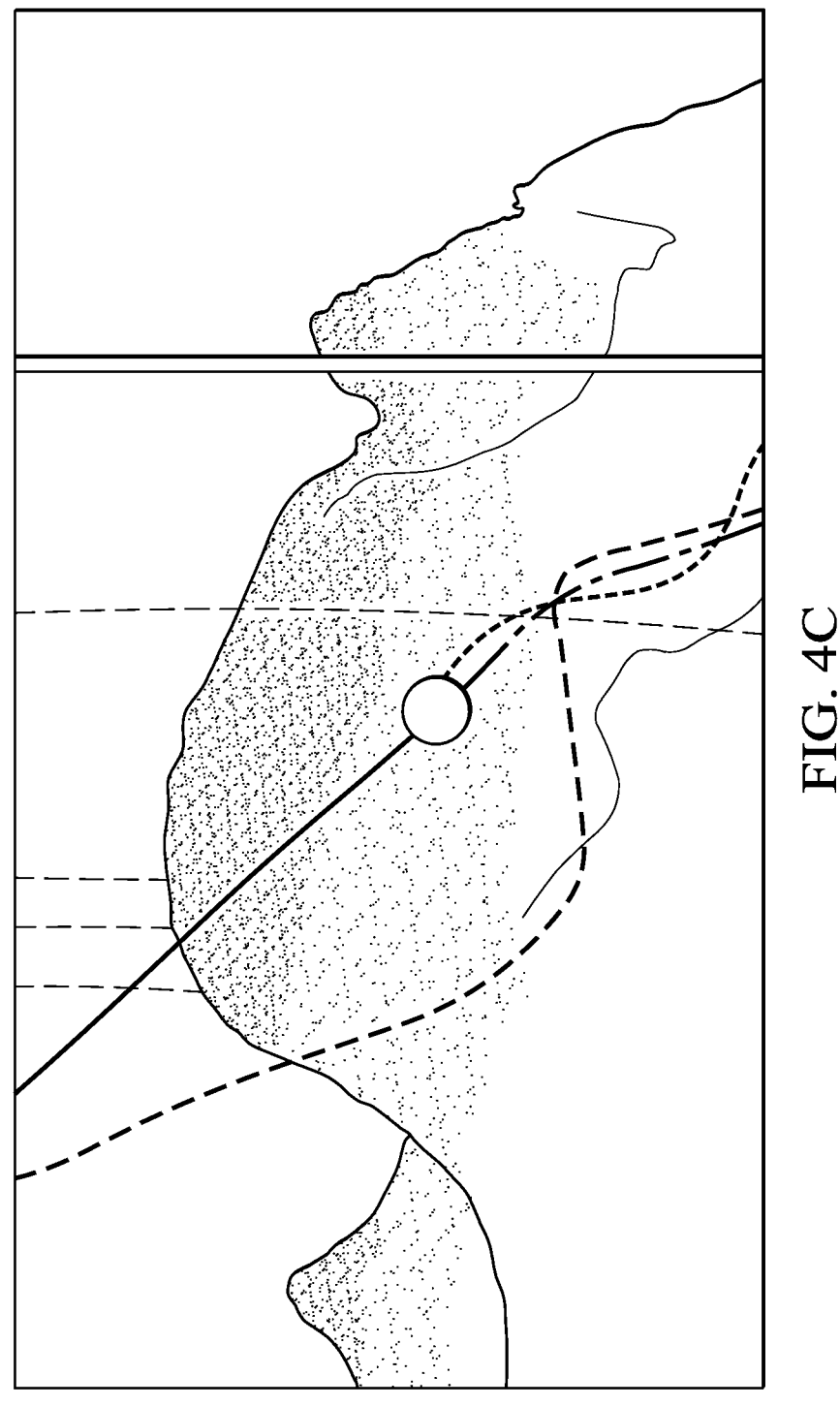

Referring now to FIGS. 4A-4C, illustrated are diagrams of the predictive engine 104 that comprises the AI engine 132, the predictive engine 104 that comprises the AI engine 132 and ML engine 140, and a visualization generated therefrom, in accordance with certain example embodiments. An earth model is predicted based on sensor data from the sensor bank and controller 22, well log data variables and seismic data variables, using known AI algorithms. The earth model can comprise logical columns of data defining parameters and values for earth physical properties and coordinates. The coordinates can be used to guide a downhole drill at a well site. Generated earth models, in an offline state, can be reduced in parameter space by using a machine learning algorithm. An AI algorithm or algorithms can be trained, i.e. reduce its parameter space, by validating the algorithm or algorithms against a trained earth model having a reduced parameter space. The trained AI algorithmic model can be used to process sensor data from the sensor bank and controller 22, well log data variables, and seismic data variables in a more efficient manner.

As used herein, an earth model comprises predictor variables that can come from field measurements from the sensor band and controller 22 or predictor variables that can come from field measurements from the sensor band and controller 22 and user input, such SME input. Trained earth models can refer to ML based drill paths or production control variables based on a-prior predictor variables and a-priori outcome variables. Outcome variables can be obtained from well planning data, such as geological surveys, and SME knowledge.

In FIG. 4A, the pattern recognition component 106 comprises the AI engine 132 configured to generate predictions used, e.g., to navigate a drill along a drill path in a downhole well environment by controlling the drill's direction, speed, and torque. The AI engine 132 is configured to predict and generate an earth model 132a that predicts relevant earth coordinates and physical properties ahead of a drill bit during drilling based on well log data and/or seismic data from the sensors and controllers 22, 24. In an embodiment, the measurement variables received from the sensors and controllers 22, 24, such as from surface and downhole sensors, identify current state of a drilling or production operation. This state information can include without limitation: drilling coordinates, production equipment measurements, rig sensing and control, fluids and additive measurements, cementing measurements and controls, wireline and perforations sense and control, telemetry, surface measurements, downhole measurements, rotary steerable electronic bit, and earth physical properties data. Since communication of this type of data from a downhole environment can result in corruption of the variables, the AI engine 132 can use a data filter component 132b, e.g. a deep particle filter known in the industry, to clean the data prior to generating the earth model. In addition, the AI engine 132 can use a forward modeling component 132c to compare predicted variables in the earth model to the measured or measured and cleaned variables in the predicted earth model 132a.

The optimization engine 136 comprises an optimization tool 136a and a drilling model or models 136b from which to sample from based on the generated earth model 132a. In an embodiment, the optimization tool 136a is a multi-objective Bayesian optimization tool. Other optimization tools include, and without limitation, genetic algorithm optimization and particle swarm optimization. The predictive engine 104 can generate a drill path(s) and/or production variables based on the output of the optimization tool 136a. The predictive engine 104 can generate a drill path(s) or production variables based on the output of the optimization tool 136a. Obviously, the predictive engine 104 can generate the drill path(s) and production variables without the use of the optimization engine.

In FIG. 4B, the pattern recognition component 106 comprises the AI engine 132 and the ML engine 140 configured to generate predictions used, e.g., using a trained AI algorithmic model to navigate a drill along a drill path in a downhole well environment by controlling the drill's direction, speed, and torque. The AI engine 132 is configured to predict and generate an earth model 132a that predicts relevant earth coordinates and physical properties ahead of a drill bit during drilling based on well log data and/or seismic data from field device components 18. In an embodiment, the measurement variables received from the field device components 18, such as from surface and downhole sensors, identify current state of a drilling or production operation. This state information can include without limitation: drilling coordinates, production equipment measurements, rig sensing and control, fluids and additive measurements, cementing measurements and controls, wireline and perforations sense and control, telemetry, surface measurements, downhole measurements, rotary steerable electronic bit, and earth physical properties data. Since communication of this type of data from a downhole environment can result in corruption of the variables, the AI engine 132 can use a data filter component 132b, e.g. a deep particle filter known in the industry, to clean the data prior to generating the earth model. In addition, the AI engine 132 can use a forward modeling component 132c to compare predicted variables in the earth model to the measured or measured and cleaned variables in the predicted earth model 132a.

The optimization engine 136 comprises an optimization tool 136a and a drilling model or models 136b from which to sample from based on the generated earth model 132a. In an embodiment, the optimization tool 136a is a multi-objective Bayesian optimization tool. The predictive engine 104 can generate a drill path(s) and/or production variables based on the output of the optimization tool 136a. The predictive engine 24 can generate a drill path(s) or production variables based on the output of the optimization tool 136a. Obviously, the predictive engine 104 can generate the drill path(s) and production variables without the use of the optimization engine.

In this embodiment, the ML engine 140 is used to store drill path variables, production control variables, earth model (predictor variables), outcome variable(s), and an objective function or functions in the storage devices 12 and/or 16 as training data. Over time, the ML engine 140 can create trained data models, e.g. trained earth models, have a reduced parameter space than those of the stored variables. The ML engine 140 generates many possible drill paths from drill bit current location to target location while passing through various waypoints and avoiding various hazardous regions and or regions which need to be avoided during drilling, for example region with water, drilling along the fault, salt region, region where mud loss possibility is higher, etc. For this purpose, a combination of pure pursuit algorithm and path searching/planning algorithms, such as RRT (Rapidly exploring random tree), RRT* (a modified version of RRT*), A* (A-Star algorithm), D* (D-Star Algorithm), HD* (Hierarchical D* Lite), etc., is utilized to generate paths having kinematic constraints for drill string, such as dogleg severity. An example of a pure pursuit algorithm is a publication from The Robotics Institute of Carnegie Mellon University entitled "Implementation of the Pure Pursuit Path Tracking Algorithm" by R. Graig Coulter dated 2 Sep. 1992. An example of RRT is a publication by Steven M. LaValle of Iowa State University and James J. Kuffner, Jr. of University of Tokyo entitled Rapidly-Exploring Random Trees: Progress and Prospects. An example of RRT* is a publication by Sertac Karaman and Emilio Frazzoli entitled "Sampling-based Algorithms for Optimal Motion Planning." An example of D* is a publication from The Robotics Institute of Carnegie Mellon University entitled "The D* Algorithm for Real-Time Planning of Optimal Traverses" by Anthony Stentz dated September 1994. An example of HD* is a publication by Matthew David Solomon entitled "Development of a Real-Time Hierarchical 3D Path Planning Algorithm for Unmanned Aerial Vehicles" submitted as a degree requirement for a Master of Science from the University of Maryland in 2016. This combination also generates information for controlling drilling attitude and, consequently, its trajectory. Bayesian optimization and/or any other optimization algorithm can be utilized to select most optimum path from the many possible paths based on multi objective criteria, such as shortest length, minimum drilling time, maximum ROP (Rate Of Penetration), minimum bit wear, minimum mud loss, minimum overall drilling cost, minimum curvature, complexity of well path, and maximum safety etc. The AI engine 132 can then reduce the parameter space of its own algorithmic model through training and validation using the data model or models having the reduced parameter space. FIG. 3C illustrates a visualization of a distribution of plausible paths that avoid obstacles. The sphere is a representation of a drill bit and it follows an optimal path defined by the converging lines after the waypoint (where the lines intersect). The other deviating line after the waypoint is an initial optimal path but based on updated measurement variables became a less efficient path.

The generated earth model 132a comprises logical columns of predictor variables that identify a future state of a drilling and production operation. This state information can include: drilling coordinates, production equipment measurements, rig sensing and control, fluids and additive measurements, cementing measurements and controls, wireline and perforations sense and control, telemetry, surface measurements, downhole measurements, rotary steerable electronic bit, and earth physical properties data.

The multi-objective Bayesian optimization tool samples from the drilling models 136b to identify an optimal outcome variable in the form of a drill path, e.g., based on multiple objectives, i.e. other outcome variables. As an example, the objectives can be, and without limitation, path length (user requires it to be minimum), drilling time (user requires it to be minimum), curvature (user requires it to be minimum) drilling cost (user requires it to be minimum), mud loss (user requires it to be minimum). All these objectives are interrelated which means that minimum values of all these objectives for a single path cannot be achieved. For example, shortest path between start and end points is a straight line. However, this path may not be feasible to drill or it passes through region where rate of penetration is low and can lead to higher value for drilling time as compared to other path. So depending on the subsurface information, a user has to make a compromise for optimum values of interrelated objective functions while selecting optimum drill path from various possible drill paths.

Referring now to FIG. 5, illustrated is a flow diagram of an algorithm for a predictive engine, in accordance with example embodiments, denoted generally as 200. The algorithm 200 begins at block 202. An earth model is generated based on a plurality of variables received from at least one of a sub-surface sensor or sensors and a surface sensor or surface sensors, at least one predictor variable, at least one outcome variable, and at least one relationship, e.g. based on a strength of relationship, between two or more variables. At block 204, the algorithm 200 predicts at least one drill path using stochastic modeling, at least one outcome variable, the predicted earth model, and at least one drilling model. In response to the predicted drill path, the algorithm 200 can generate a visualization, block 206. At block 208, the algorithm 200 stores the earth model, the at least one drill path, and the plurality of variables and use a machine learning algorithm to train data and create drilling models based on the trained data. The algorithm 200 can store at least one of the earth model, the at least one drill path, the plurality of variables, and the drilling models in a distributed storage network, e.g. as entries in a blockchain database system. At block 210, the drill path for a downhole drill bit is adjusted based on the difference between the current drill path and the at least one predicted drill path. In embodiment, the drill path can be adjusted when the difference between the current drill path and the at least one predicted drill path exceeds a predetermined threshold. At block 212, the algorithm 200 can updated the generated visualization. At block 214, the algorithm 200 sends commands to the system controller component 16 for distribution to appropriate controllers of field device components 18.

Figure 6:
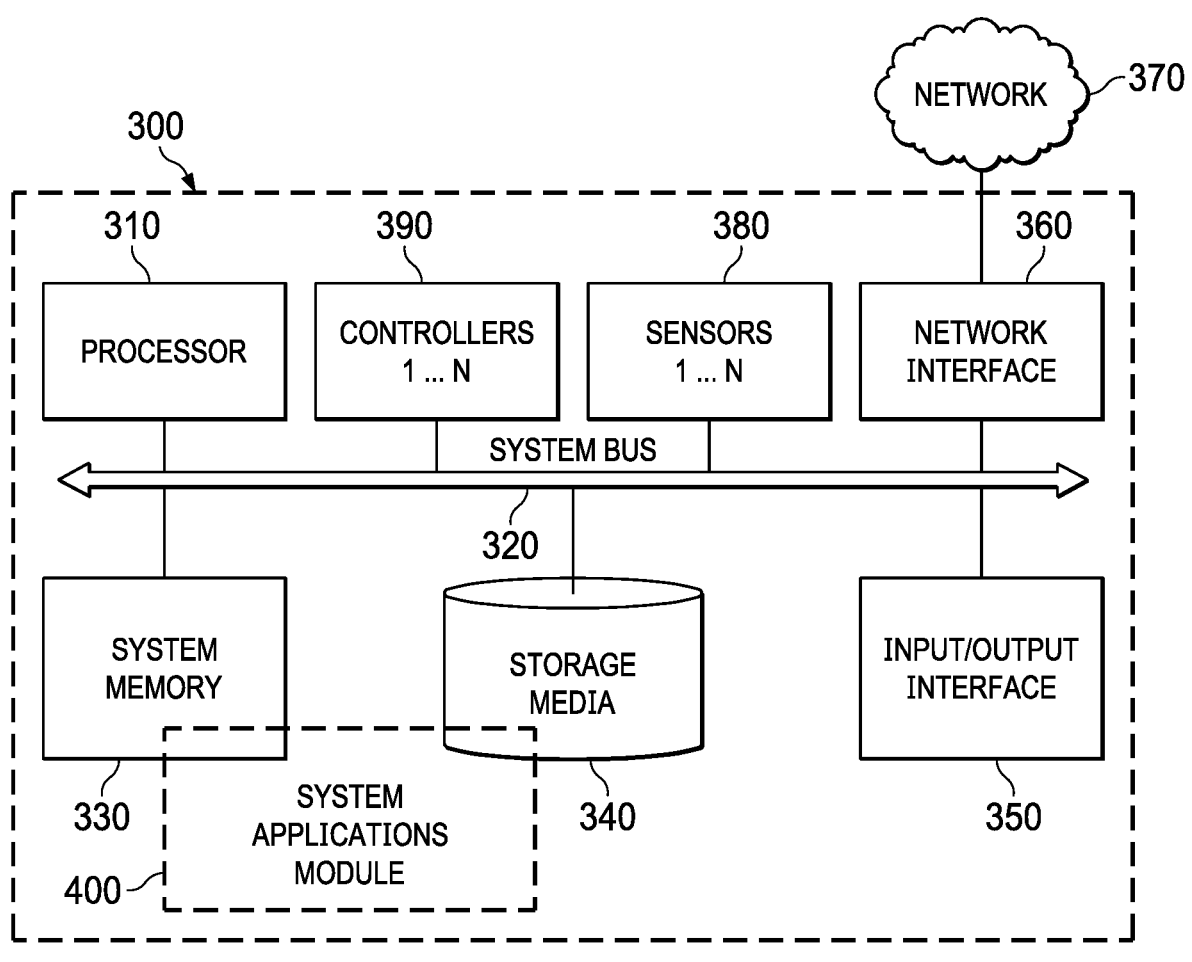
FIG. 6 is an illustration of a computing machine and a system applications module, in accordance with certain example embodiments.

Referring now to FIG. 6, illustrated is a computing machine 300 and a system applications module 400, in accordance with example embodiments. The computing machine 300 can correspond to any of the various computers, mobile devices, laptop computers, servers, embedded systems, or computing systems presented herein. The system applications module 400 can comprise one or more hardware or software elements, e.g. other OS application and user and kernel space applications, designed to facilitate the computing machine 300 in performing the various methods and processing functions presented herein. The computing machine 300 can include various internal or attached components such as a processor 310, system bus 320, system memory 330, storage media 340, input/output interface 350, a network interface 360 for communicating with a network 370, e.g. a loopback, local network, wide-area network, cellular/GPS, Bluetooth, WIFI, and WIMAX, and sensors 380, and controllers 390.

The computing machine 300 can be implemented as a conventional computer system, an embedded controller, a laptop, a server, a mobile device, a smartphone, a wearable computer, a customized machine, any other hardware platform, or any combination or multiplicity thereof. The computing machine 300 and associated logic and modules can be a distributed system configured to function using multiple computing machines interconnected via a data network and/or bus system.

The processor 310 can be designed to execute code instructions in order to perform the operations and functionality described herein, manage request flow and address mappings, and to perform calculations and generate commands. The processor 310 can be configured to monitor and control the operation of the components in the computing machines. The processor 310 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 310 can be a single processing unit, multiple processing units, a single processing core, multiple processing cores, special purpose processing cores, co-processors, or any combination thereof. According to certain embodiments, the processor 310 along with other components of the computing machine 300 can be a software based or hardware based virtualized computing machine executing within one or more other computing machines.

The system memory 330 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 330 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 330. The system memory 330 can be implemented using a single memory module or multiple memory modules. While the system memory 330 is depicted as being part of the computing machine, one skilled in the art will recognize that the system memory 330 can be separate from the computing machine 300 without departing from the scope of the subject technology. It should also be appreciated that the system memory 330 can include, or operate in conjunction with, a non-volatile storage device such as the storage media 340.

The storage media 340 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 340 can store one or more operating systems, application programs and program modules, data, or any other information. The storage media 340 can be part of, or connected to, the computing machine. The storage media 340 can also be part of one or more other computing machines that are in communication with the computing machine such as servers, database servers, cloud storage, network attached storage, and so forth.

The applications module 400 and other OS application modules can comprise one or more hardware or software elements configured to facilitate the computing machine with performing the various methods and processing functions presented herein. The applications module 400 and other OS application modules can include one or more algorithms or sequences of instructions stored as software or firmware in association with the system memory 330, the storage media 340 or both. The storage media 340 can therefore represent examples of machine or computer readable media on which instructions or code can be stored for execution by the processor 310. Machine or computer readable media can generally refer to any medium or media used to provide instructions to the processor 310. Such machine or computer readable media associated with the applications module 400 and other OS application modules can comprise a computer software product. It should be appreciated that a computer software product comprising the applications module 400 and other OS application modules can also be associated with one or more processes or methods for delivering the applications module 400 and other OS application modules to the computing machine via a network, any signal-bearing medium, or any other communication or delivery technology. The applications module 400 and other OS application modules can also comprise hardware circuits or information for configuring hardware circuits such as microcode or configuration information for an FPGA or other PLD. In one exemplary embodiment, applications module 400 and other OS application modules can include algorithms capable of performing the functional operations described by the flow charts and computer systems presented herein.

The input/output ("I/O") interface 350 can be configured to couple to one or more external devices, to receive data from the one or more external devices, and to send data to the one or more external devices. Such external devices along with the various internal devices can also be known as peripheral devices. The I/O interface 350 can include both electrical and physical connections for coupling the various peripheral devices to the computing machine or the processor 310. The I/O interface 350 can be configured to communicate data, addresses, and control signals between the peripheral devices, the computing machine, or the processor 310. The I/O interface 350 can be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 350 can be configured to implement only one interface or bus technology. Alternatively, the I/O interface 350 can be configured to implement multiple interfaces or bus technologies. The I/O interface 350 can be configured as part of, all of, or to operate in conjunction with, the system bus 320. The I/O interface 350 can include one or more buffers for buffering transmissions between one or more external devices, internal devices, the computing machine, or the processor 320.

The I/O interface 320 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 320 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 300 can operate in a networked environment using logical connections through the network interface 360 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The sensors 380 and controllers 390 can be components of field device components 18, i.e. surface and sub-surface sensors, configured to sense various physical properties, i.e. mechanical, chemical, and electrical properties, of surface sub-surface downhole machines and surrounding environment and communicate sensed data to the sensor hub 20.

The processor 310 can be connected to the other elements of the computing machine or the various peripherals discussed herein through the system bus 320. It should be appreciated that the system bus 320 can be within the processor 310, outside the processor 310, or both. According to some embodiments, any of the processors 310, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a system for managing well site operations, the system comprising: a well site operations module communicable coupled to a distributed network, the well site operations module generates earth model variables using: a physics model; at least one of selected from a group comprising well log data variables and seismic data variables; and at least one selected from a group comprising a trained artificial intelligence algorithmic model and a trained machine learning algorithmic model; and a chain of blocks of the distributed network comprising a genesis block and a plurality of subsequent blocks, each subsequent block comprising a well site entry and a cryptographic hash value of a previous well site entry, wherein the well site entry comprises at least one transacted operation control variable;

Clause 2, the system of clause 1, wherein the well site operations module further performs multi-objective Bayesian optimization on the generated earth model variables;

Clause 3, the system of any of the previous clauses, further comprising a plurality of Robot Operating System (ROS) nodes of the distributed network, wherein each ROS node performs multi-objective Bayesian optimization on the generated earth model variables;

Clause 4, the system of any of the previous clauses, wherein the well site operations module generates at least one operation control variable selected from a group comprising: well site production operation control variables; and at least one well site development operation control variables;

Clause 5, the system of any of the previous clauses, wherein the well site entry comprises at least one selected from a group comprising a transacted earth model variable and a sensor variable;

Clause 6, the system of any of the previous clauses, further comprising a sensor bank communicable coupled to well site equipment for providing the well log data variables and a controller module communicable coupled the well site equipment and to at least one selected from a group comprising the well site operations module and the plurality of storage nodes, wherein the well site entry comprises the well log data variables;

Clause 7, the system of any of the previous clauses, wherein the well site operations module communicable couples the at least one transacted operation control variable to controller module to control operations of well site equipment;

Clause 8, the system of any of the previous clauses, wherein cryptographic hash value of the previous block is generated using a public key infrastructure and comprises at least one selected from a group comprising: a public key of an entity performing a transaction and a digital signature that certifies the entity;

Clause 9, an apparatus for managing well site operations, the apparatus comprising: a chain of blocks of the distributed network comprising a genesis block and a plurality of subsequent blocks, each subsequent block comprising a well site entry and a cryptographic hash value of a previous well site entry, wherein the well site entry comprises at least one transacted operation control variable; and a well site automation module communicable coupled to a well site operations module and a sensor bank and controller module, the well site automation module creates blocks and transactions and communicable couples variables between well site entries, the well site operations module, and the sensor bank and controller module;

Clause 10, the apparatus of clause 9, wherein the transacted earth model variables are optimization variables optimized using multi-objective Bayesian optimization;

Clause 11, the apparatus of any of the previous clauses, wherein the transacted earth model variables are optimization variables optimized using multi-objective Bayesian optimization, wherein optimization is performed using a plurality of Robot Operating System (ROS) nodes of the distributed network;

Clause 12, the apparatus of any of the previous clauses, wherein the well site entry further comprises transacted well log data variables provided by a sensor bank communicable coupled to well site equipment;

Clause 13, the apparatus of any of the previous clauses, wherein the well site operations module generates at least one control variable selected from a group comprising: well site production operation control variables; and at least one well site development operation control variables;

Clause 14, the apparatus of any of the previous clauses, wherein the well site automation module communicably couples transacted operation control variables to the sensor bank and controller module;

Clause 15, the apparatus of any of the previous clauses, wherein cryptographic hash value of the previous block is generated using a public key infrastructure and comprises at least one selected from a group comprising: a public key of an entity performing a transaction and a digital signature that certifies the entity;

Clause 16, a method for managing well site operations, the method comprising: generating earth model variables using: a physics model; at least one of selected from a group comprising well log data variables and seismic data variables; and at least one selected from a group comprising a trained artificial intelligence algorithmic model and a trained machine learning algorithmic model; generating operation control variables based on the generated earth model variables; and creating a chain of blocks of the distributed network comprising a genesis block and a plurality of subsequent blocks, each subsequent block comprising a well site entry and a cryptographic hash value of a previous well site entry, wherein the well site entry comprises at least one transacted operation control variable;

Clause 17, the method of clause 16, further comprising performing multi-objective Bayesian optimization on the generated earth model variables;

Clause 18, the method of any of the previous clauses, further comprising performing multi-objective Bayesian optimization on the generated earth model variables using a plurality of Robot Operating System (ROS) nodes of the distributed network, wherein each ROS node;

Clause 19, the method of any of the previous clauses, generating at least one operation control variable selected from a group comprising: well site production operation control variables; and at least one well site development operation control variables; and Clause 20, the method of any of the previous clauses, further comprising: creating at least one transacted earth model variable in the well site entry; generating well log data variables; and creating well log data variable entries in the well site entry.

What is claimed is:

1. A system for managing well site operations, the system comprising:

one or more processors communicably coupled to a distributed network; and one or more memory devices including instructions executable on the one or more processors, the instructions including instructions to generate earth model variables using:

a physics model, one or more well log data variables and/or seismic data variables, and at least one of a trained artificial intelligence algorithmic model and/or a trained machine learning algorithmic model, instructions to generate operation control variables based on the generated earth model variables, instructions to generate a display of a drill path and the earth model variables, instructions to optimize the generated earth model variables by sampling the earth model variables based on at least one drilling model and an optimization tool to predict at least one optimized drill path, the optimized drill path being predicted according to one or more objective criteria including a shortest length, minimum drilling time, maximum Rate Of Penetration, minimum bit wear, minimum mud loss, minimum overall drilling cost, minimum curvature, complexity of well path, and maximum safety, and instructions to update the display based on the at least one optimized drill path;

instructions to maintain a chain of blocks of the distributed network comprising a genesis block and a plurality of subsequent blocks, each subsequent block comprising a well site entry and a cryptographic hash value of a previous well site entry, wherein the well site entry comprises at least one of the operation control variables; and instructions to operate a sensor bank and controller module to route at least one of the operation control variables to a controller for controlling well site equipment.

2. The system of claim 1, wherein the instructions further include instructions to perform multi-objective Bayesian optimization on the generated earth model variables.

3. The system of claim 1, further comprising a plurality of Robot Operating System (ROS) nodes of the distributed network, wherein each ROS node performs multi-objective Bayesian optimization on the generated earth model variables.

4. The system of claim 1, wherein the instructions include instructions to generate at least one operation control variable of a well site production operation control variables and/or a well site development operation control variable.

5. The system of claim 1, wherein the well site entry comprises at least one of a transacted earth model variable and/or a sensor variable.

6. The system of claim 1, further comprising a sensor bank communicably coupled to the well site equipment to provide the well log data variables and the sensor bank and controller module communicably coupled to the well site equipment and to at least one selected from a group comprising a well site operations module and a plurality of storage nodes, wherein the well site entry comprises the well log data variables.

7. The system of claim 6, wherein the system communicably couples the at least one transacted operation control variable to the controller module to control operations of the well site equipment.

8. The system of claim 1, wherein cryptographic hash value of a previous block is generated using a public key infrastructure and comprises at least one selected from a group comprising: a public key of an entity performing a transaction and a digital signature that certifies the entity.

9. An apparatus for managing well site operations, the apparatus comprising:

one or more processors;

one or more memory devices including instructions executable on the one or more processors, the instructions including instructions to maintain a chain of blocks of a distributed network comprising a genesis block and a plurality of subsequent blocks, each subsequent block comprising a well site entry and a cryptographic hash value of a previous well site entry, wherein the well site entry comprises at least one operation control variable;

instructions to operate a sensor bank and controller module to route at least one of the operation control variables to a controller for controlling well site equipment; and instructions to generate earth model variables using: a physics model, one or more well log data variables and/or seismic data variables; and at least one of a trained artificial intelligence algorithmic model and/or a trained machine learning algorithmic model, instructions to generate the operation control variables based on the generated earth model variables, instructions to generate a display of a drill path and the earth model variables, instructions to optimize the generated earth model variables by sampling the earth model variables based on at least one drilling model and an optimization tool to predict at least one optimized drill path, the optimized drill path being predicted according to one or more objective criteria including a shortest length, minimum drilling time, maximum Rate Of Penetration, minimum bit wear, minimum mud loss, minimum overall drilling cost, minimum curvature, complexity of well path, and maximum safety, instructions to update the display based on the at least one optimized drill path, instructions to create blocks and transactions, and instructions to communicably couple variables between well site entries, a well site operations module, and a sensor bank and controller module.

10. The apparatus of claim 9, wherein the transacted earth model variables are optimization variables optimized using multi-objective Bayesian optimization.

11. The apparatus of claim 9, wherein the transacted earth model variables are optimization variables optimized using multi-objective Bayesian optimization, wherein optimization is performed using a plurality of Robot Operating System (ROS) nodes of the distributed network.

12. The apparatus of claim 9, wherein the well site entry further comprises transacted well log data variables provided by the sensor bank communicably coupled to the well site equipment.

13. The apparatus of claim 9, wherein the instructions include instructions to generate at least one control variable selected from a group comprising: well site production operation control variables and at least one well site development operation control variable.

14. The apparatus of claim 13, wherein the instructions include instructions to communicably couple transacted operation control variables to the sensor bank and controller module.

15. The apparatus of claim 9, wherein cryptographic hash value of a previous block is generated using a public key infrastructure and comprises at least one selected from a group comprising: a public key of an entity performing a transaction and a digital signature that certifies the entity.

16. A method for managing well site operations, the method comprising:

generating earth model variables using: a physics model, one or more well log data variables and/or seismic data variables, and at least one of a trained artificial intelligence algorithmic model and/or a trained machine learning algorithmic model;

generating operation control variables based on the generated earth model variables; generating a display of a drill path and the earth model variables;

optimizing the generated earth model variables by sampling the earth model variables based on at least one drilling model and an optimization tool to predict at least one optimized drill path, the optimized drill path being predicted according to one or more objective criteria including a shortest length, minimum drilling time, maximum Rate of Penetration, minimum bit wear, minimum mud loss, minimum overall drilling cost, minimum curvature, complexity of well path, and maximum safety;

updating the display based on the at least one optimized drill path;

creating a chain of blocks of the distributed network comprising a genesis block and a plurality of subsequent blocks, each subsequent block comprising a well site entry and a cryptographic hash value of a previous well site entry, wherein the well site entry comprises at least one of the operation control variables; and operating a sensor bank and controller module to route at least one of the operation control variables to a controller for controlling well site equipment.

17. The method of claim 16, further comprising performing multi-objective Bayesian optimization on the generated earth model variables.

18. The method of claim 16, further comprising performing multi-objective Bayesian optimization on the generated earth model variables using a plurality of Robot Operating System (ROS) nodes of the distributed network, wherein each ROS node.

19. The method of claim 16, generating at least one operation control variable selected from a group comprising: well site production operation control variables; and at least one well site development operation control variables.

20. The method of claim 19, further comprising:

creating at least one transacted earth model variable in the well site entry;

generating well log data variables; and creating well log data variable entries in the well site entry.

* * * * *